A. WILSON.
Improvement in Saw-Gummers.
No. 130,398.          Patented Aug. 13, 1872.
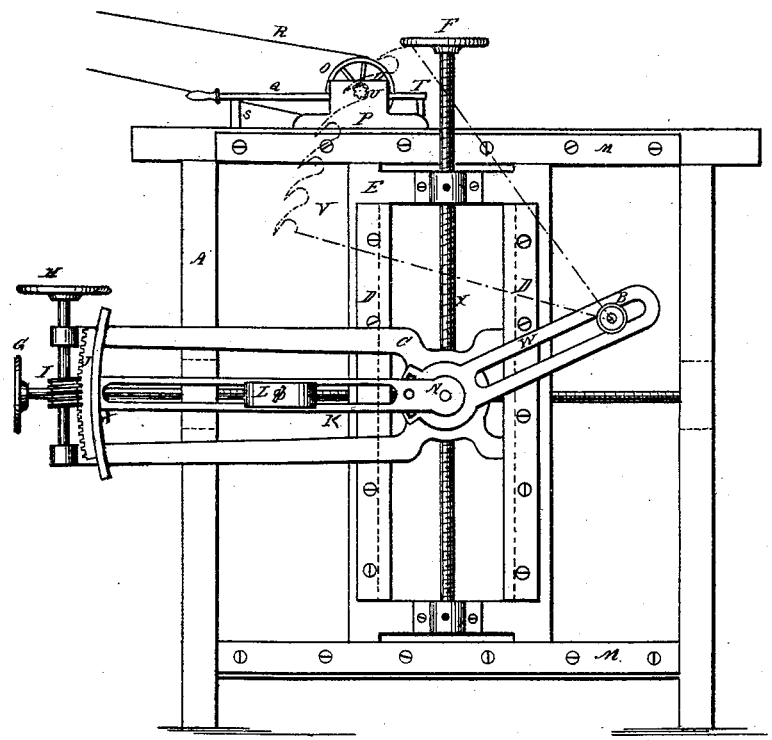
Witnesses.
E. C. Burgess.
Jas. E. Pugh
Inventor.
Alvin Wilson

UNITED STATES PATENT OFFICE.

ALVIN WILSON, OF OSHKOSH, WISCONSIN.

IMPROVEMENT IN SAW-GUMMERS.

Specification forming part of Letters Patent No. 130,398, dated August 13, 1872.

Specification describing a Power-Burr Saw-Gummer, invented by ALVIN WILSON, of Oshkosh, county of Winnebago and State of Wisconsin.

The drawing represents a side elevation of a machine embodying my invention.

A is the frame of the machine, made of wood. B is a nut, bolt, and washer, acting as a pivot or center on which the saw rests, and adjustable at any point in the slotted frame W. C is another iron frame, which holds W and slides up and down on the slides D D. E is a movable frame, which holds the slides D D. F is a hand-wheel, which turns the screw X which raises or lowers the frame C. N is a center-pin, on which the frame W rests. K is also a small iron piece, resting on center-pin N, and terminating at the end in the rack J. The pieces K and W are connected by a thumb-nut at the small slot in W. I is a worm, which, by moving the rack J, communicates an eccentric movement to the saw V, resting on pivot B. G is another hand-wheel and screw, which gives a horizontal movement to frame E, which moves in the slides M M. U is a steel cutter or burr at the end of a little shaft, driven by the belt R and pulley O. Q is a lever which moves the shaft and cutter sidewise, so that after it has cut one tooth it may be withdrawn and the saw moved one tooth further. L is an adjustable clamp, which serves to steady the saw while gumming.

The mode of operating is this: The saw is placed upon the pivot B and the nut set up firmly. The clamp L is then adjusted to hold the side of saw. The cutter U revolves about fifty times a minute, and by the hand-wheels F G H the saw is brought to the cutter and guided in any direction required.

I claim—

1. The combination of the hand-wheel and screw G and the frame E with the frames K and W, as and for the purposes hereinbefore set forth.

2. I claim the combination of the pieces K and W with the worm I and rack J to produce a curved movement.

3. The combination of the hand-wheel F and screw X with the frames K and W and slides D D, for the purpose set forth.

ALVIN WILSON.

Witnesses:
E. C. BURGESS,
JAS. E. PUGH.